(12) United States Patent
Hobden et al.

(10) Patent No.: US 12,082,738 B2
(45) Date of Patent: Sep. 10, 2024

(54) BEVERAGE DISPENSING APPARATUS AND METHOD FOR ACTIVE PRESSURE CONTROL THEREOF

(71) Applicant: LAVAZZA PROFESSIONAL UK LIMITED, Basingstoke (GB)

(72) Inventors: Stephen Hobden, Winklebury (GB); Paul Fletcher, Camberley (GB)

(73) Assignee: Luigi Lavazza S.p.A., Turin (IT)

( * ) Notice: Subject to any disclaimer, the term of this patent is extended or adjusted under 35 U.S.C. 154(b) by 731 days.

(21) Appl. No.: 17/268,793

(22) PCT Filed: Aug. 16, 2019

(86) PCT No.: PCT/IB2019/000927
§ 371 (c)(1),
(2) Date: Feb. 16, 2021

(87) PCT Pub. No.: WO2020/035736
PCT Pub. Date: Feb. 20, 2020

(65) Prior Publication Data
US 2021/0361112 A1 Nov. 25, 2021

Related U.S. Application Data

(60) Provisional application No. 62/831,529, filed on Apr. 9, 2019.

(30) Foreign Application Priority Data

Aug. 17, 2018 (GB) ...................................... 1813478

(51) Int. Cl.
*A47J 31/52* (2006.01)
*A47J 31/44* (2006.01)
(Continued)

(52) U.S. Cl.
CPC ....... *A47J 31/5251* (2018.08); *A47J 31/4492* (2013.01); *A47J 31/5253* (2018.08);
(Continued)

(58) Field of Classification Search
CPC ................ A47J 31/5251; A47J 31/5253; A47J 31/4492; B67D 1/0078; B67D 1/0884; B67D 1/0888; B67D 1/125
(Continued)

(56) References Cited

U.S. PATENT DOCUMENTS

2014/0053734 A1 2/2014 Santi
2014/0053735 A1 2/2014 Santi
2015/0208851 A1 7/2015 Grassia

FOREIGN PATENT DOCUMENTS

CN 103298381 A 9/2013
CN 103799847 A 5/2014
(Continued)

OTHER PUBLICATIONS

International Search Report for Related Application PCT/IB2019/000927, mailed Jan. 20, 2020.
(Continued)

*Primary Examiner* — Brent T O'Hern
(74) *Attorney, Agent, or Firm* — The Belles Group, P.C.

(57) ABSTRACT

A beverage dispensing apparatus and methods for active pressure control thereof. In one aspect, a method for controlling a beverage dispensing apparatus may include: a) determining whether a first beverage to be prepared at a first temperature or a second beverage to be prepared a second temperature has been selected for preparation, the first temperature being greater than the second temperature; and b) selecting a maximum pressure threshold for a beverage preparation fluid circuit of the beverage dispensing apparatus based on whether the first beverage or the second
(Continued)

beverage has been selected in step a), wherein the maximum pressure threshold is set by selecting from at least a first pressure threshold when the first beverage has been determined to have been selected and a second pressure threshold when the second beverage has been determined to have been selected, the first pressure being less than the second pressure.

19 Claims, 10 Drawing Sheets

(51) Int. Cl.
 *B67D 1/00* (2006.01)
 *B67D 1/08* (2006.01)
 *B67D 1/12* (2006.01)
(52) U.S. Cl.
 CPC ......... *B67D 1/0078* (2013.01); *B67D 1/0884* (2013.01); *B67D 1/0888* (2013.01); *B67D 1/125* (2013.01)
(58) Field of Classification Search
 USPC .......................................................... 426/232
 See application file for complete search history.

(56) References Cited

FOREIGN PATENT DOCUMENTS

| | | | |
|---|---|---|---|
| CN | 105339483 A | 2/2016 | |
| CN | 106231964 A | 12/2016 | |
| CN | 106659316 A | 5/2017 | |
| DE | 3327590 A1 | 2/1985 | |
| DE | 60208084 T2 | 8/2006 | |
| EP | 2494895 | 9/2012 | |
| JP | H0551089 A | 3/1993 | |
| JP | 2016/193262 | 11/2016 | |
| JP | 2017/530739 | 10/2017 | |
| JP | 2017-530739 A | 10/2017 | |
| WO | WO 2013/094350 | 6/2013 | |
| WO | WO-2013164779 A1 * | 11/2013 | ............ A47J 31/401 |
| WO | WO 2015/036525 A1 | 3/2015 | |
| WO | WO 2015/124592 | 8/2015 | |
| WO | WO-2016127126 A1 * | 8/2016 | ............ A47J 31/002 |
| WO | WO 2016/147696 | 9/2016 | |
| WO | WO-2017174399 A1 * | 10/2017 | ............ A47J 31/407 |

OTHER PUBLICATIONS

United Kingdom Search Report for Priority Application No. 1813478.3, dated Feb. 13, 2019.

* cited by examiner

BEVERAGE DISPENSING APPARATUS AND METHOD FOR ACTIVE PRESSURE CONTROL THEREOF

CROSS-REFERENCE TO RELATED APPLICATIONS

The present application claims priority to United Kingdom Patent Application No. 1813478.3, filed on Aug. 17, 2018, and U.S. Provisional Patent Application Ser. No. 62/831,529, filed Apr. 9, 2019, the entireties of which are incorporated herein by reference.

BACKGROUND

The present invention relates to coffee, tea, and other beverage dispensing machines, particularly, but not exclusively, to beverage dispensing machines which use a pressurized process to produce hot and chilled drinks.

The use of beverage dispensing machines, such as coffee machines, is commonplace, particularly in the workplace. A common type of these machines uses a drink pack which is inserted into the machine and into which a fluid, typically water, is introduced to brew and dispense the drink. For example, coffee grounds are contained within the pack and hot water is injected into the pack allowing the coffee to be brewed therein. The pack is designed to burst open in a controlled manner (such as by delamination at one end) as a result of increased water pressure, thereby allowing the brewed coffee to exit the pack through a filter mesh. Because the water is introduced at pressure, there is a slight risk that the pack may burst open in an uncontrolled manner. As a result, a safety valve, in the form of a pressure release valve is provided to ensure that the pressure within the pack does not exceed the known delamination or bursting point of the pack. As an example, a pressure release valve set at 9.5 psi protects the machine from causing packs, which may burst at pressures in excess of 9.5 psi, from bursting.

In order to get stronger flavours from some drinks, for example strong coffee drinks, this 9.5 psi pressure limit is not optimum for brewing. A solution to this problem is to extend the brewing time, which can be problematic as long brewing times for drinks can be unacceptable to users. An alternative is to include high pressure packs which are more expensive to produce and require additional physical support for the packs to restrict expansion thereby preventing bursting. Such physical support adds mechanical complexity to the beverage dispensing machines, which in turn adds additional manufacturing costs.

There are also occasions when it is necessary to reduce the brewing temperature of the water used. For example, a typical hot water temperature for such machines is 92° C., this being hot enough to brew tea, coffee and other such hot drinks but not hot enough to cause the water in the machine to boil. However, if the machine is located at a high altitude above sea level, the boiling point of water is lower, which makes it necessary to lower the water temperature to ensure that water does not inadvertently start boiling within the machine. This lowering of the water temperature can affect the quality of the drink being brewed or require a significant increase in the time needed to prepare the drink.

BRIEF SUMMARY

Exemplary embodiments according to the present disclosure are directed to a beverage dispensing apparatus and methods for controlling the same. The beverage dispensing apparatus includes a controller for controlling a fluid pressure during the process of preparing a beverage. In certain embodiments, the controller may be configured to set a maximum pressure threshold or beverage preparation pressure based upon the temperature of the beverage selected for preparation. In certain other embodiments, the controller may be configured to actively regulate the beverage preparation fluid circuit of the beverage dispensing apparatus in order to maintain a selected beverage preparation pressure, or maintain the beverage preparation pressure below a selected maximum pressure threshold, during preparation of the beverage. In still other embodiments, the controller may be configured to adjust a temperature setting of a heater, which heats fluid used for preparing beverages, based on a measurement of an ambient temperature. The method of operating a beverage dispensing apparatus, in certain embodiments, may include setting a maximum pressure threshold or beverage preparation pressure based upon the temperature of the beverage selected for preparation. In certain other embodiments, the method may include regulating the beverage preparation fluid circuit of the beverage dispensing apparatus in order to maintain a selected beverage preparation pressure, or maintain the beverage preparation pressure below a selected maximum pressure threshold, during preparation of the beverage. In still other embodiments, the method may include adjusting a temperature setting of a heater of the beverage dispensing apparatus based on a measurement of an ambient temperature.

In one aspect, the invention may be a method of operating a beverage dispensing apparatus, including: a) determining whether a first beverage to be prepared at a first temperature or a second beverage to be prepared a second temperature has been selected for preparation, the first temperature being greater than the second temperature; and b) selecting a maximum pressure threshold for a beverage preparation fluid circuit of the beverage dispensing apparatus based on whether the first beverage or the second beverage has been determined to have been selected in step a), wherein the maximum pressure threshold is set by selecting from at least a first pressure threshold when the first beverage has been determined to have been selected and a second pressure threshold when the second beverage has been determined to have been selected, the first pressure threshold being less than the second pressure threshold.

In another aspect, the invention may be a method of operating a beverage dispensing apparatus, including: a) determining whether a first beverage to be prepared at a first temperature or a second beverage to be prepared at a second temperature has been selected for preparation, the first temperature being greater than the second temperature; and b) selecting from at least a first beverage preparation pressure and a second beverage preparation pressure for operating a beverage preparation circuit of the beverage dispensing apparatus based on whether the first beverage or the second beverage has been determined to have been selected in step a), the first beverage preparation pressure being less than second beverage preparation pressure.

In yet another aspect, the invention may be a method of operating a beverage dispensing apparatus, including: pumping water out of a water outlet of a water supply line and through a beverage ingredient container to dispense a beverage; measuring a pressure in the water supply line at a position which is upstream of the water outlet and beverage ingredient container; and determining an estimated pressure at the water outlet based on the measured pressure and a flow rate of water through the water supply line.

In still another aspect, the invention may be a method of operating a beverage dispensing apparatus, including: pumping fluid into a beverage preparation fluid circuit comprising an outlet; measuring a pressure in the beverage preparation fluid circuit; and determining an estimated pressure at the outlet based on the measured pressure and a flow rate of the fluid pumped into the beverage preparation fluid circuit.

In still another aspect, the invention may be a method of operating a beverage dispensing apparatus, including: measuring ambient atmospheric pressure at the beverage dispensing apparatus relative to a reference pressure using a sealed pressure sensor; and adjusting a temperature setting of a heater of the beverage dispensing apparatus based on the ambient atmospheric pressure.

In another aspect, the invention may be a beverage dispensing apparatus, including: a beverage preparation fluid circuit; a controller operably coupled to the beverage preparation circuit, wherein the controller is configured to perform the steps of: a) receiving a beverage selection input for preparation of a beverage; b) determining whether the beverage selection input indicates that a first beverage to be prepared at a first temperature or a second beverage to be prepared a second temperature has been selected for preparation, the first temperature being greater than the second temperature; and c) selecting a maximum pressure threshold for the beverage preparation fluid circuit based on whether the first beverage or the second beverage has been determined to have been selected in step c), wherein the maximum pressure threshold is set by selecting from at least a first pressure threshold when the first beverage has been determined to have been selected and a second pressure threshold when the second beverage has been determined to have been selected, the first pressure threshold being less than the second pressure threshold.

In yet another aspect, the invention may be a beverage dispensing apparatus, including: a beverage preparation fluid circuit; a controller operably coupled to the beverage preparation circuit, wherein the controller is configured to perform the steps of: a) receiving a beverage selection input for preparation of a beverage; b) determining whether the beverage selection input indicates that a first beverage to be prepared at a first temperature or a second beverage to be prepared at a second temperature has been selected for preparation, the first temperature being greater than the second temperature; and c) selecting from at least a first beverage preparation pressure and a second beverage preparation pressure for operating the beverage preparation circuit based on whether the first beverage or the second beverage has been determined to have been selected in step b), the first beverage preparation pressure being less than second beverage preparation pressure.

In still another aspect, the invention may be a beverage dispensing apparatus, including: a water tank; a water supply line connected to the water tank and having a water pump for pumping water from the water tank to a water outlet at a distal end of the water supply line, wherein the water outlet is connectable to a beverage ingredient container; a pressure sensor connected to the water supply line at a position upstream of the water outlet; and a controller configured to receive an output from the pressure sensor indicative of the pressure at the position upstream of the water outlet and to determine an estimated pressure at the water outlet based on the received output and a flow rate of water through the water supply line.

In still another aspect, the invention may be a beverage dispensing apparatus, including: a fluid pump for pumping fluid into a beverage preparation fluid circuit comprising an outlet; a pressure sensor positioned to sense a pressure of the beverage preparation fluid circuit; and a controller configured to receive an output from the pressure sensor and to determine an estimated pressure at the outlet based on the received output and a flow rate of the fluid through the fluid pump.

In still another aspect, the invention may be a beverage dispensing apparatus, including: a water tank; a water supply line connected to the water tank and having a water pump for pumping water from the water tank to a water outlet at a distal end of the water supply line, wherein the water outlet is connectable to a beverage ingredient container; a heater disposed between the water tank and the water outlet for heating the water; a sealed pressure sensor configured to measure ambient atmospheric pressure relative to a reference pressure; and a controller configured to receive an output from the sealed pressure sensor indicative of the ambient atmospheric pressure and to adjust a temperature setting of the heater based on the ambient atmospheric pressure.

In still another aspect, the invention may be a beverage dispensing apparatus, including: a beverage preparation fluid circuit comprising an outlet; a heater positioned upstream of the outlet to heat fluid for the beverage preparation fluid circuit; a sealed pressure sensor configured to measure ambient atmospheric pressure relative to a reference pressure; and a controller configured to receive an output from the sealed pressure sensor and to adjust a temperature setting of the heater based on the measured ambient atmospheric pressure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION

Figure 1:
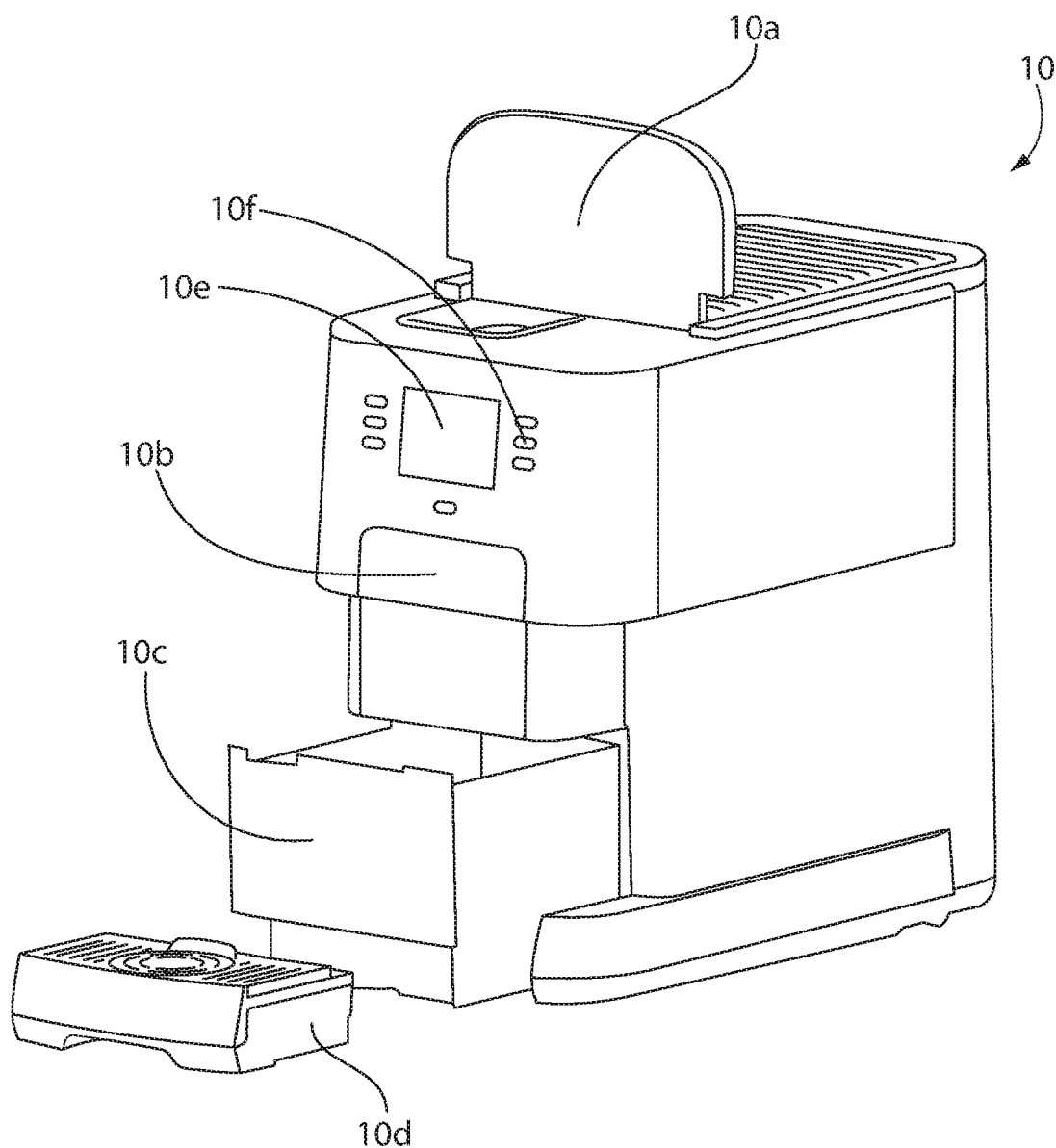
FIG. 1 is a perspective view of a beverage dispensing apparatus in accordance with a first embodiment of the invention.

The following description of the embodiment(s) of the invention is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

Features of the present invention may be implemented in software, hardware, firmware, or combinations thereof. The processes described herein are not limited to any particular embodiment, and may be implemented in an operating system, application program, foreground or background processes, driver, a programmable controller or processor, or any combination thereof. The programmable processes may be executed on a single programmable device or on or across multiple programmable devices. The terms "controller" and "processor" are used herein interchangeably.

Processors and/or controllers described herein may include any central processing unit (CPU), microprocessor, micro-controller, computational, or programmable device or circuit configured for executing computer program instructions (e.g. code). Such devices may include an application specific integrated circuit (ASIC), a field programmable gate array (FPGA), a programmable logic controller (PLC), and/or a graphics processing unit (GPU), among other devices with similar capabilities. Moreover, the processor and/or controller may include all the usual ancillary components necessary to form a functional data processing/controlling device including without limitation any one or combination of the following: a bus, software and data storage such as volatile and non-volatile memory, input/output devices, a display screen, graphical user interfaces (GUIs), removable data storage, and wired and/or wireless communication interface devices including Wi-Fi, Bluetooth, LAN, etc.

Computer-executable instructions or programs (e.g. software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a processor/controller configured to execute such non-transitory computer-executable instructions or programs may be referred to hereinafter as a "programmable device", or just a "device" for short, and multiple programmable devices in mutual communication may be referred to as a "programmable system". It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g. internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

As used herein, the terms "hot" beverage and "cold" beverage are used, and their meanings are intended as used and accepted in the coffee and tea brewing industry. The term "hot" beverage is any beverage that is prepared using a fluid, such as water, that is over about 70° Celsius and less than a boiling temperature. Comparatively, the term "cold" beverage is any beverage that is prepared using a fluid, such as water, that is at ambient temperature or lower. A beverage may also be prepared at a "warm" temperature, which is any temperature between the hot and cold ranges.

Referring to FIGS. 1-6, a beverage dispensing apparatus 10 includes a fluid delivery apparatus 12 for delivering fluid to a single use, disposable beverage ingredient container 14, which in the figures is shown in the form of a flexible-walled ingredient pack. The beverage ingredient container 14 contains ingredients 14*g* which, when mixed with a fluid, produce a drink which is transferred to a drinking vessel such as a cup 16.

The fluid may be any type of fluid used to prepare and dispense the drink. In certain embodiments, the fluid may be water. In other embodiments, the fluid may be milk, juice, or any other base consumable fluid. In certain embodiments, the beverage ingredient container 14 may be any type of container which includes an ingredient for preparing a drink by mixing with the fluid and which is configured to be coupled to the beverage dispensing apparatus 10 for preparation of the beverage under pressure. For simplification, the beverage dispensing apparatus 10 and its processes are described below using water as the fluid. Of course, the invention is not to be so limited unless expressly recited in the claims.

With specific reference to FIG. 1, the beverage dispensing apparatus 10 comprises a water tank 32 accessible via a lid 10a on top of the apparatus and a container compartment having a door 10b for receiving the beverage ingredient container 14. The beverage dispensing apparatus 10 also includes a bin 10c which sits below the container compartment and receives the beverage ingredient containers 14 after use. The bin 10c is received in a cavity formed in the beverage dispensing apparatus 10 and is removed for emptying. A removable drip tray 10d is included at the bottom of the beverage dispensing apparatus 10. The drip tray 10d includes a grill which forms a support surface for supporting the cup 16 when the beverage dispensing apparatus 10 is dispensing a beverage. A tray portion of the drip tray 10d is located beneath the grille for catching any spillage which passes through the grille.

The beverage dispensing apparatus 10 also has a user interface in the form of a display screen 10e and a plurality of selection buttons 10f which allow a user to control the function of the beverage dispensing apparatus 10. For example, the selection buttons 10f allow a user to select beverage making parameters. In certain embodiments, the display screen 10e may instead be a touch screen, which would both display information to a user and permit the user to control the function of the beverage dispensing apparatus 10 by touching the touch screen to provide user input.

Figure 2:
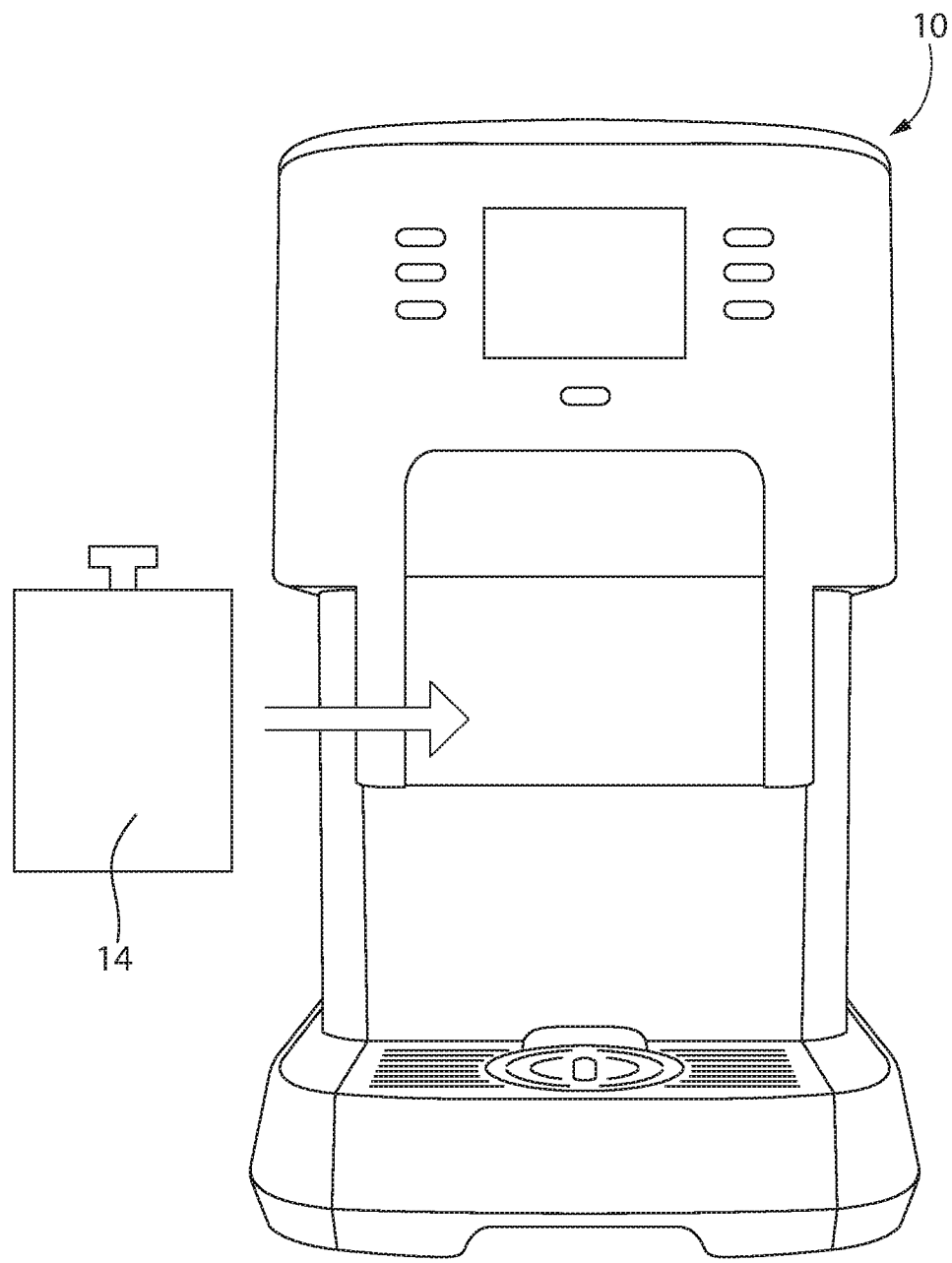
FIG. 2 is a front view of the beverage dispensing apparatus of FIG. 1, shown with a beverage ingredient container to be inserted therein.

As shown in FIG. 2, a beverage ingredient container 14, in the form of a flexible-walled ingredient pack, is used in the beverage dispensing apparatus 10. The operation and use of the beverage ingredient container 14 will hereinafter be described in conjunction with the use of a beverage ingredient container 14 in the form of a flexible-walled ingredient pack. However, it is to be understood that the invention is not to be so limited unless expressly recited in the claims.

Figure 3:
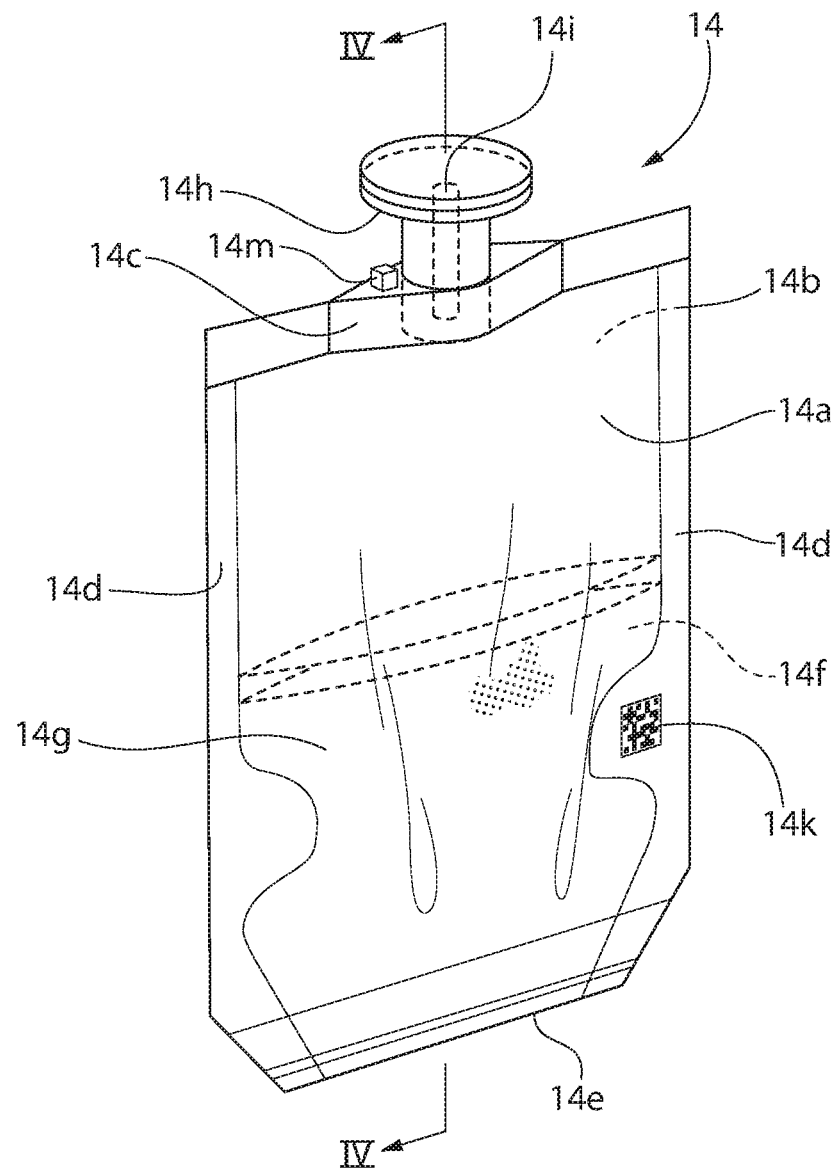
FIG. 3 illustrates a perspective view of the beverage ingredient container.
Figure 4A:
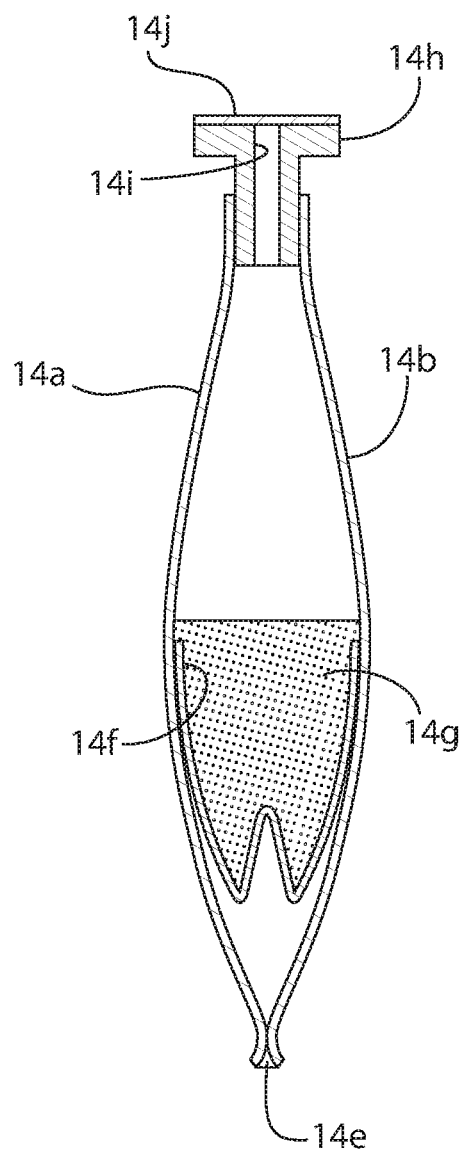
FIG. 4A illustrates a sectional view of the beverage ingredient container in a sealed state along the line IV-IV of FIG. 3.
Figure 4B:
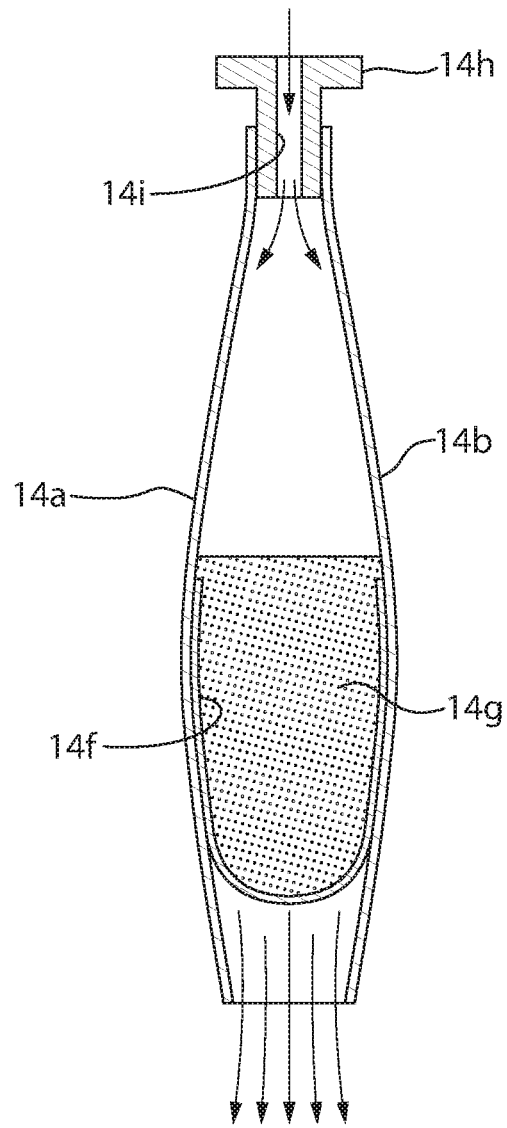
FIG. 4B illustrates a sectional view of the beverage ingredient container in a burst open state for dispensing a beverage along the line IV-IV of FIG. 3.

As shown in FIGS. 3 and 4A-B, the beverage ingredient container 14 includes a front sheet 14a and a back sheet 14b, both of which are formed from liquid and air impermeable sheet materials, with the front and back sheets 14a, 14b being bonded together around the top edge 14c and side edges 14d. The front sheet 14a and back sheet 14b are also bonded together along a bottom edge 14e, and this bond is formed to be releasable under the effect of a predetermined amount of heat and/or pressure inside the beverage mixing container 14. By way of example, the bonding of the bottom edge 14e may be by means of a pressure and/or heat sensitive adhesive. Folded within the beverage ingredient container 14 is a web of filter material 14f, which is bonded to the inside walls of the front sheet 14a and the back sheet 14b. The web of filter material 14f supports the beverage ingredient 14g, such as ground coffee or leaf tea. Any other type of beverage ingredient may also be included. The beverage ingredient container 14 also includes a nozzle 14h which has a tubular bore 14i extending therethrough along a centreline of the beverage ingredient container 14. The nozzle 14h is formed into the top edge of the beverage ingredient container 14 and bonded in airtight fashion to the front sheet 14a and to the back sheet 14b. The nozzle 14h is flanged to assist locating the beverage ingredient container 14 correctly within the beverage dispensing apparatus 10. The tubular bore 14i is initially sealed with a suitable airtight freshness barrier 14j. It should however be noted that this is merely an exemplary example of a beverage ingredient container 14 and that the beverage dispensing apparatus 10 may be configured to accept and prepare beverages using other types of beverage ingredient containers 14, such as packs or capsules. The beverage ingredient container 14 may also include a visual indicia 14k, such as a barcode, QR code, color code, and the like, which may be used to indicate to the beverage dispensing apparatus 10 a temperature at which a beverage prepared with the beverage ingredient container 14 is to be prepared. The beverage ingredient container 14 may alternatively include a structural feature 14m which used to indicate to the beverage dispensing apparatus 10 a temperature at which a beverage prepared with the beverage ingredient container 14 is to be prepared. Of course, such visual indicia or structural feature may also be used to convey other information about the beverage ingredient container 14 to the beverage dispensing apparatus 10.

Figure 5:
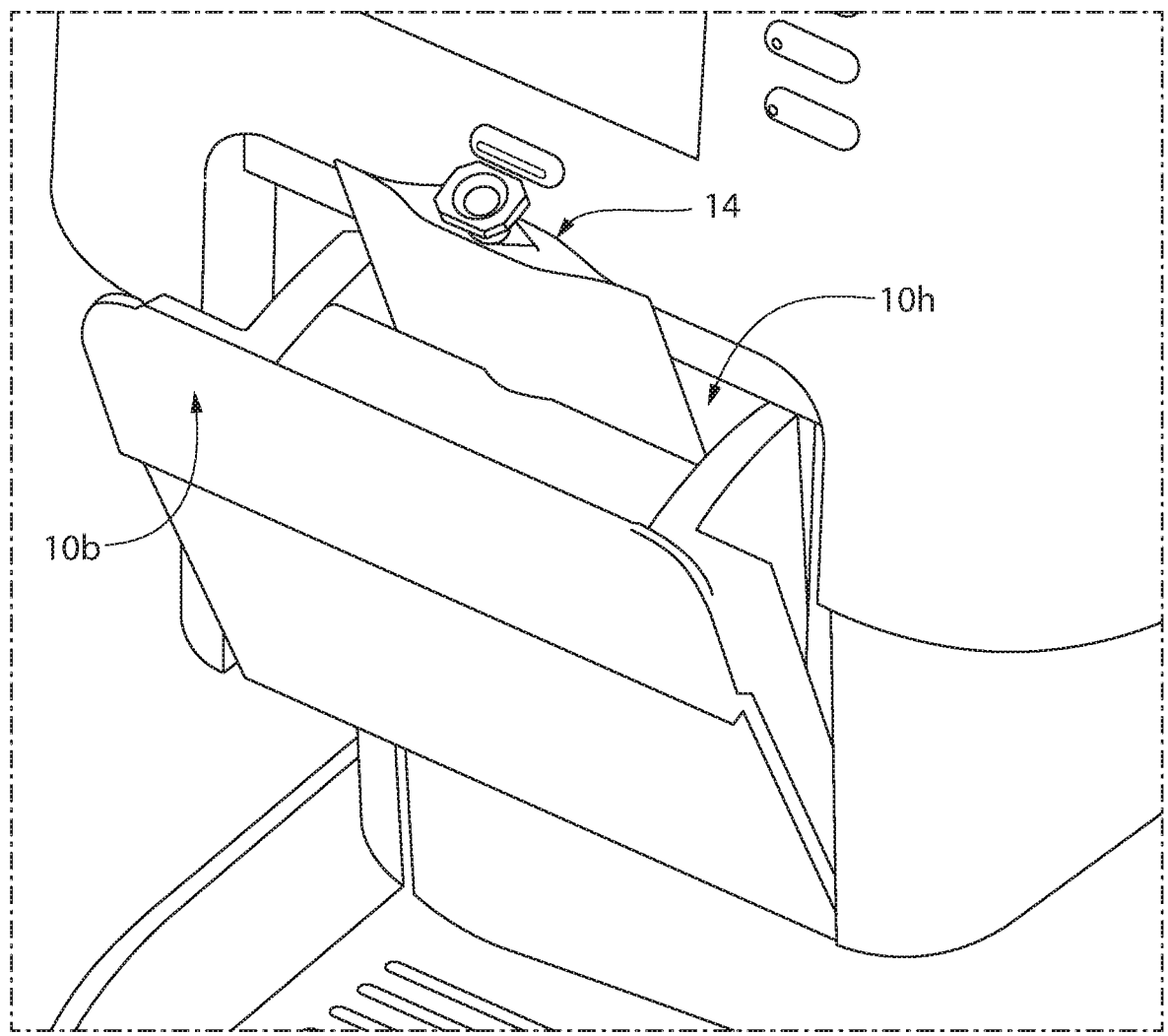
FIGS. 5 and 6 illustrate the insertion of the beverage ingredient container of FIGS. 2-4B into the beverage dispensing apparatus.
Figure 6:
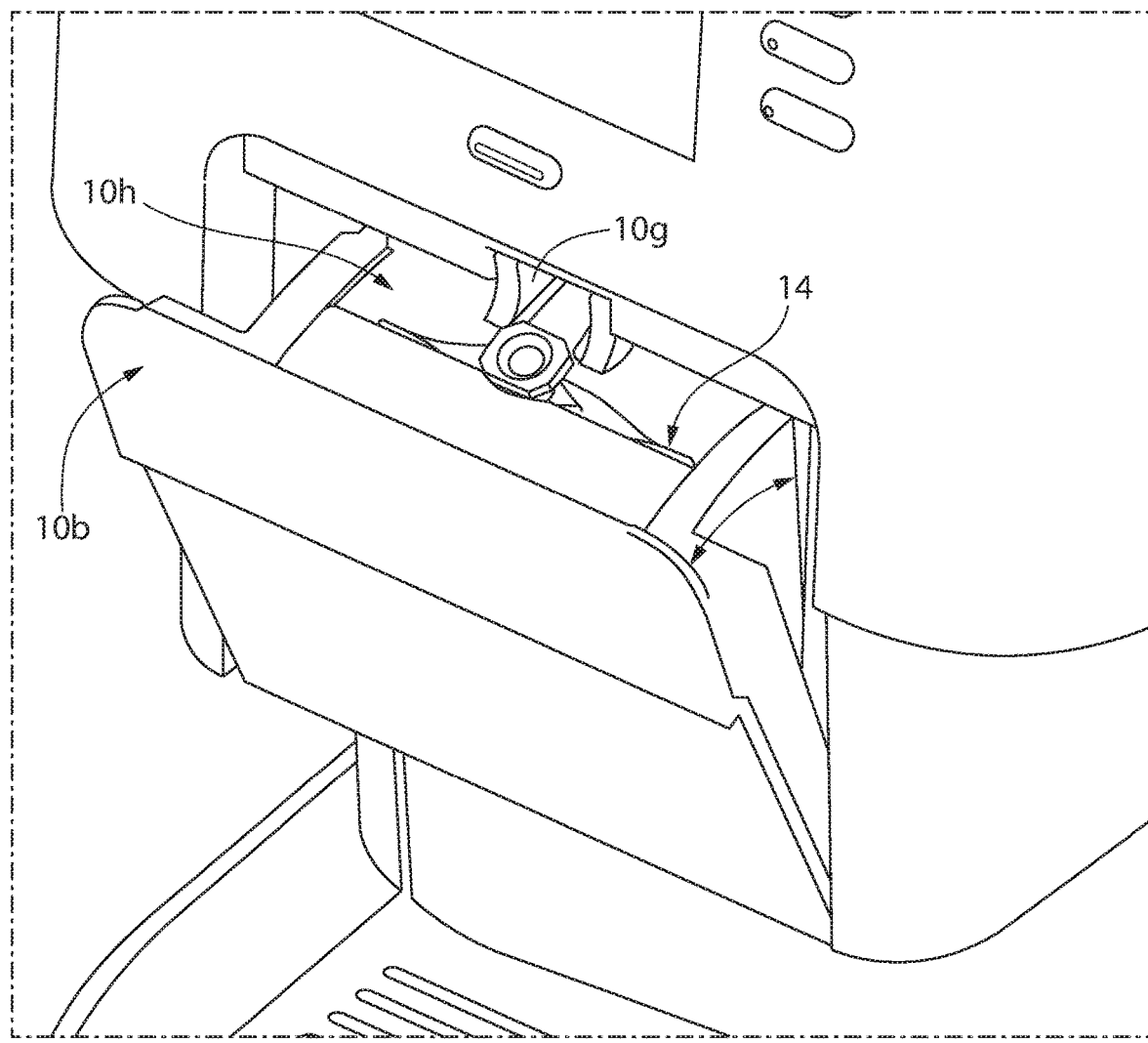

During use the beverage ingredient container 14 is introduced into the container compartment in the beverage dispensing apparatus 10 via a holder in the door 10d. As is shown in FIGS. 5 and 6, The door is pivotable, at its base, between an open position and a closed position. Once a user-selected beverage ingredient container 14 is in position within the container compartment and the door 10d is closed, the beverage preparation process may be initiated. In certain embodiments, initiation of the beverage preparation process may require user input via the selection buttons 10f. In certain other embodiments, insertion of the beverage ingredient container 14 may be sufficient to initiate the beverage preparation process.

Figure 7:
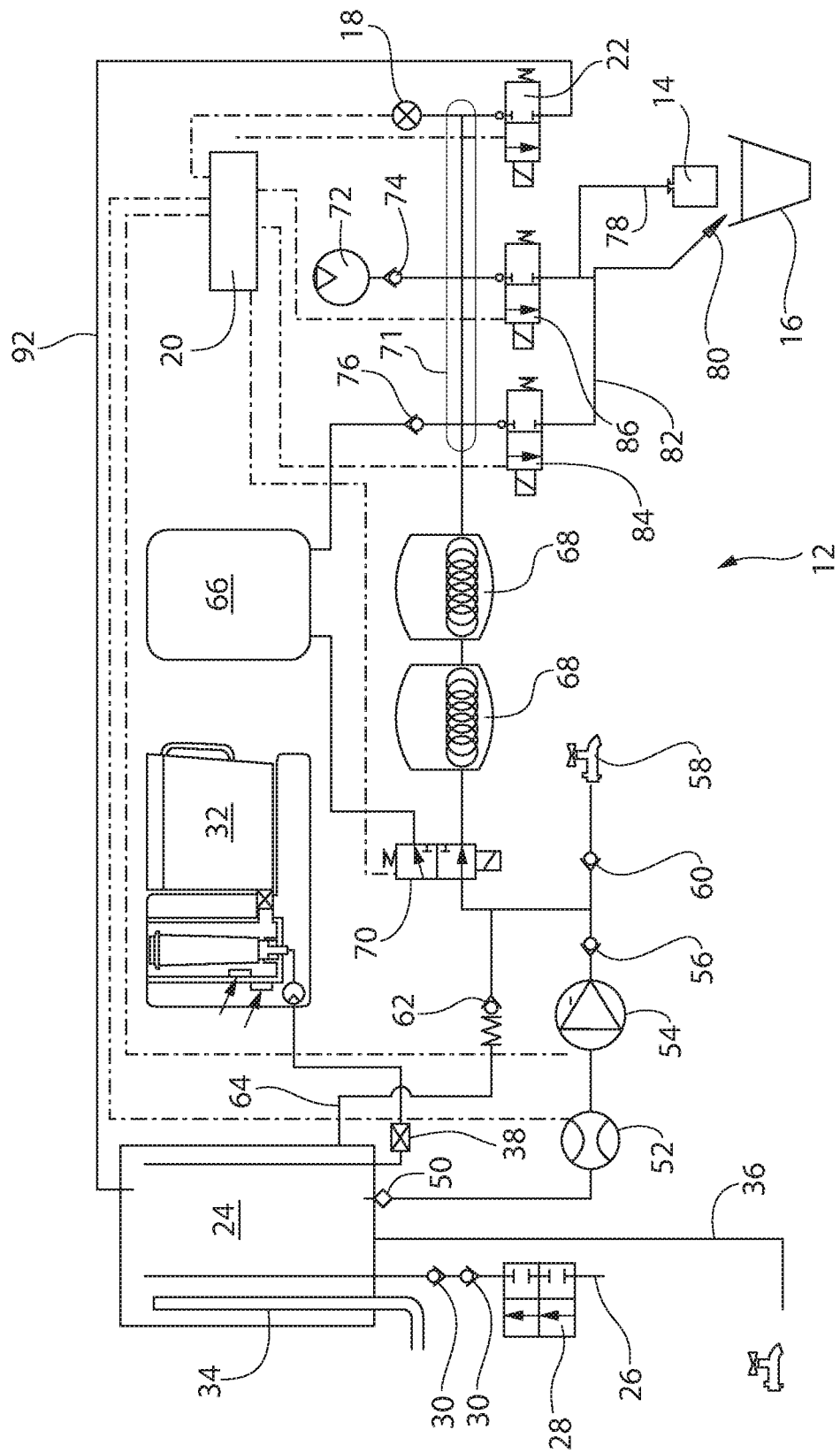
FIG. 7 is a schematic representation of the beverage dispensing apparatus of FIG. 1.

The control system of the beverage dispensing apparatus 10 is illustrated in FIG. 7 overlaid with the beverage preparation fluid circuit 12. The control system includes a controller 20 communicably connected to multiple components of the beverage preparation fluid circuit 12. Thus, the controller 20 is able to receive signals from and/or send control signals to the connected components to control the operation of aspects of the beverage preparation fluid circuit 12. By way of example, the beverage preparation fluid circuit 12 includes a pressure sensor 18 which is communicably connected to the controller 20. The pressure sensor 18 measures the pressure of the water within a pressurizable portion of the beverage preparation fluid circuit 12, which includes the supply manifold 71, and provides a signal to the controller 20 based on the measured pressure. This pressure sensor 18 is shown placed just upstream of the beverage ingredient container 14. In certain embodiments, the pressure sensor 18 may be placed in other positions within the pressurizable portion of the beverage preparation fluid circuit 12, with the understanding that there would be a known relationship between the pressure measured at the position of the pressure sensor 18 and the pressure at the outlet of the pressurizable portion of the beverage preparation fluid circuit 12, the outlet being where the beverage ingredient container 14 sealingly couples to the beverage preparation fluid circuit 12. As indicated by the use of dotted and dashed lines, the controller 20 is also communicably connected to the flow meter 52, water pump 54, solenoid divert valve 70, air pump 72 and the solenoid valves 22, 84, 86. Other connections between components of the beverage dispensing apparatus 10 and the controller 20 may beneficial to the operation of the beverage dispensing apparatus 10, although such additional connections are not shown. However, those listed above are the main connections to facilitate operation of the apparatus and pressure control mechanism described herein. These connections enable the controller 20 to control most or all of the beverage preparation process, including both pressurizing and depressurizing the pressurizable portion of the beverage preparation fluid circuit 12 as needed to regulate the water pressure therein before and during preparation of a beverage.

The beverage preparation fluid circuit 12 includes a water holding tank 24 to hold water which is used to prepare the drinks. Water in this water holding tank 24 may be maintained at an ambient temperature. In other embodiments, the water holding tank 24 may include a chiller to reduce the temperature of the water therein to below an ambient temperature. The water holding tank 24 can be supplied directly from a continuous mains water supply 26 via a solenoid inlet valves 28 and a pair of nonreturn valves 30. Alternatively, a reservoir tank 32 can be filled manually to hold water equivalent to many drinks, and water in the reservoir tank 32 is transferred to the water holding tank 24 via a coupling 38. The water holding tank 24 includes a float level sensor (not shown) to ensure that the water holding tank 24 contains at least enough water for the maximum drink size. The water holding tank 24 also includes an overflow discharge 34 and a drain line 36, the latter being coupled to a cold drain tap 38, which is closed under standard operating conditions. Water from the water holding tank 24 enters the remainder of the beverage preparation circuit 12 via an odour and taste filter 50. A flowmeter 52 is included in the outlet line from the water holding tank 24 so that the volume of water taken may be measured. Data from the flowmeter 52 is passed to the controller 20, which also controls a low pressure direct current water pump 54. A nonreturn valve 56 protects the pump 54 and a further drain tap 58 is included to drain the dispensing machine from the downstream side of the pump 54. A further nonreturn valve 60 prevents any contamination of the water system from the hot drain tap 58, which is closed under standard operating conditions. Further protection for the beverage preparation fluid circuit 12 is provided by a pressure release valve 62 which is set to a higher pressure than is required in any beverage ingredient container 14. For example, the pressure release valve 62 can be set to 22 psi and in the event of the pressure exceeding this limit returns water to the water holding tank 24 via water line 64

The beverage preparation fluid circuit 12 also includes a water chilling tank 66 which enables cold or chilled drinks to be prepared and dispensed. The chilling tank 66 includes a cooling system (not shown) for reducing the temperature of the water in, or as water enters, the chilling tank 66 to a predetermined temperature at or below ambient temperature. The temperature to which water in the chilling tank 66 is reduced may be controlled by the controller 20. The predetermined temperature is typically set at between 55° to 65° Celcius. In certain embodiments, the temperature of the water in the chilling tank 66 may not be reduced at all below ambient temperature. Insulation may also be provided for the chilling tank 66 to help maintain the lowered temperature of the water therein. Because the beverage dispensing apparatus 10 is configured to vend hot and cold beverages, the beverage preparation fluid circuit 12 includes a fluid heating component, shown as a pair of heating tanks 68, which are used to heat water to a predetermined temperature under the control of the controller 20. The predetermined temperature is typically 92° C. when the ambient pressure is at sea level pressure. In certain embodiments, the controller 20 may set the temperature to which water is heated in the heating tanks 68. With the chilling tank 66 and the heating tanks 68, a user may select a beverage to be prepared at the heated water temperature, or the user may select a beverage to be prepared at the chilled water temperature. In certain embodiments, the user's selection of a particular beverage ingredient container 14 will automatically make the selection for the user of whether a hot beverage is prepared or a cold beverage is prepared. In still other embodiments, water from the chilling tank 66 may be mixed with water from the heating tanks 68 to prepare a beverage at a temperature that is between the hot water temperature and the cold water temperature. In yet other embodiments, the heating and cooling of the water may be performed inline as water flows from the water tank 32, such that no additional tanks are needed to store heated or chilled water.

A three port two output (3/2) divert solenoid valve 70 controls the flow of water from the pump 54 to either the chilling tank 66 or the heating tanks 68. The divert valve 70 operates under the control of the controller 20 to determine whether a hot or cold drink is being dispensed. It is the selection of the output of the valve 70 which determines the temperature of the water entering the beverage ingredient container 14 since the temperature of the water from each input is regulated by a thermostatically controlled heating or cooling system. However, as an alternative or an addition, a thermometer may be included as part of the beverage preparation fluid circuit 12, for example adjacent the pressure sensor 18, to measure the water temperature and send this information to the controller 20.

An air pump 72 is also included and operates as part of the dispensing process by pumping air through the beverage ingredient container 14 to ensure maximum delivery of the water from within the beverage ingredient container 14 and/or provide frothing of the drink. A nonreturn valve 74 is included to prevent contamination of the air pump with water and a further nonreturn valve 76 is located on the exit line of the chilling tank 66 to ensure there is no contamination of the chilling tank with hot water.

The air pump 72 may be activated after a beverage has been dispensed in order to de-water the beverage ingredient container 14 by blowing air through it via the injector valve 22. Doing so curtails any drips from the beverage-ingredient container 14. Air may also be blown through the mixing nozzle 80 in a similar manner to remove any remaining water.

The beverage ingredient container 14 is connected to the beverage preparation fluid circuit 12 via an outlet on water line 78. Further delivery of water into the cup 16 can occur through a mixing jet 80 which directs water straight into the cup 16 without passing through the beverage ingredient container 14 via a further water line 82. The control of the water from the water delivery apparatus 12 into the cup 16, either via the beverage ingredient container 14 or mixing jet 80, is under the control of a pair of solenoid valves 84 and 86. The solenoid valve 84 is in water line 82 and determines whether water enters the cup 16 via the mixing jet 80 whereas solenoid valve 86 is in water line 78 and determines whether water is passing through the beverage ingredient container 14.

Operational aspects of the beverage dispensing apparatus 10 will now be described. Except where noted that user input is provided, in certain embodiments the controller 20 may be configured and/or programmed to control all operation of the beverage dispensing apparatus 10. In certain embodiments, however, it may be desirable to have certain operational aspects either manually controlled or otherwise occur outside of direct control of the controller 20.

During standard operation, a user selects a drink by choosing a beverage ingredient container 14 (such as a standard hot filter coffee) and inserts it into the dispensing apparatus 10. An injector nozzle connected to water line 78 is inserted into the beverage ingredient container 14, such that a pressure seal is formed between the beverage preparation fluid circuit 12 and the beverage ingredient container 14. The controller 20, determining that the drink is ready to be made switches on the water pump 54. Because the selected drink is a hot drink, the solenoid divert valve 70 is switched to the output line directed towards heating tanks 68, which pushes water, pumped from the water holding tank 24, into the heating tanks 68, which in turn pushes hot water out of the heating tanks 68 toward the supply manifold 71, and from there into the beverage ingredient container 14. The controller 20 opens the valve 86 causing water to pass along line 78 through the injector and into the beverage ingredient container 14. As shown in FIG. 4, upon introduction of water through the injector tube and the nozzle bore 14 icon, the beverage preparation ingredient 14g, contained in the beverage ingredient container 14, is mixed with the water and the beverage is brewed. This injection of water causes the beverage ingredient container 14 to expand under the increased pressure with the front and back sheets 14a, 14b moving away from each other. The bottom edge 14e of the container 14 is configured to burst open, or delaminate, under the effect of heat and pressure inside the beverage ingredient container 14. The prepared beverage passes through the filter web 14f and the open bottom edge 14e of the beverage ingredient container 14, and is collected in the cup 16. The period of time which is required to open the bottom edge 14e is dependent on temperature and the pressure of the water entering the beverage ingredient container 14. Once the beverage ingredient container 14 is open, additional water may be pumped through the filter 14f by keeping the valve 86 open. Alternatively, the valve 84 may be opened to allow water to be injected into the cup without passing through the beverage ingredient container 14.

In the event of a problem, for example, if the beverage ingredient container 14 does not open, the pressure within the beverage ingredient container 14 may exceed 9.5 psi. This undesirably high pressure will be detected by pressure sensor 18, such that the controller 20 sends a signal to open the solenoid valve 22 in order to venting water back to the water holding tank 24 via water line 92.

A similar beverage preparation process occurs if a chilled drink is selected. The selection process can either be manual where the user instructs the beverage dispensing apparatus 10 via a user interface 10e and 10f that a cold drink has been selected. Alternatively, the beverage ingredient container 14 may automatically indicate to the controller 20 that a chilled drink has been selected. This automatic indication could be through a visual recognition system, for example, by having a barcode, QR code, or other visual indicia on the external surface on the beverage ingredient container 14 and an optical reading device connected to the controller 20 for identifying the beverage ingredient container 14 as it is inserted. As a further alternative, a different arrangement of nozzle could be included as part of the beverage ingredient container 14, with the different nozzle including physical elements which trip microswitches to provide this information to the controller 20, thereby providing a structural feature to the beverage ingredient container 14 to allow the water input temperature to be determined automatically. As yet another alternative, the width of a beverage ingredient container 14 for a cold beverage could be different from the width of a beverage ingredient container 14 for a hot beverage, with the beverage dispensing apparatus 10 including sensors to detect the width of an inserted beverage ingredient container 14 to thereby automatically select a hot or cold beverage. Whether by automated or manual user entry, the controller 20 receives a signal indicating the water temperature selected for the beverage to be prepared and is therefore instructed to produce a cold beverage. As a result, the pump 54 operates and the divert valve 70 switches to direct the water to the chilling tank 66. The water entering the chilling tank 66 pushes the chilled water out through the nonreturn valve 76. The controller 20 causes the solenoid valve 86 to open thereby directing the chilled water through the water line 78 and into the beverage ingredient container 14.

The process under which the bottom edge 14e of a beverage ingredient container 14 ends up bursting is dependent on more factors than just the pressure. The temperature of the beverage ingredient container 14, which is dependent on the temperature of the liquid injected into the beverage ingredient container 14, as well as the time that a particular pressure and temperature of water resides within the beverage ingredient container 14 are also factors determining when the bottom edge 14e will delaminate and burst open. It is therefore possible to vary the pressure and duration (that is time that water spends in a beverage ingredient container 14) depending upon the temperature of the water entering the beverage ingredient container 14 to provide some control over when the beverage ingredient container 14 will burst open. As a result, it is possible to dynamically control the pressure for beverage preparation based on the temperature of the water used for preparing each beverage to help prevent unwanted delamination of the beverage ingredient container 14. Further, in certain embodiments, it is possible to control the time the water has been in the beverage ingredient container 14 under pressure to help prevent unwanted delamination of the beverage ingredient container 14.

Figure 8:
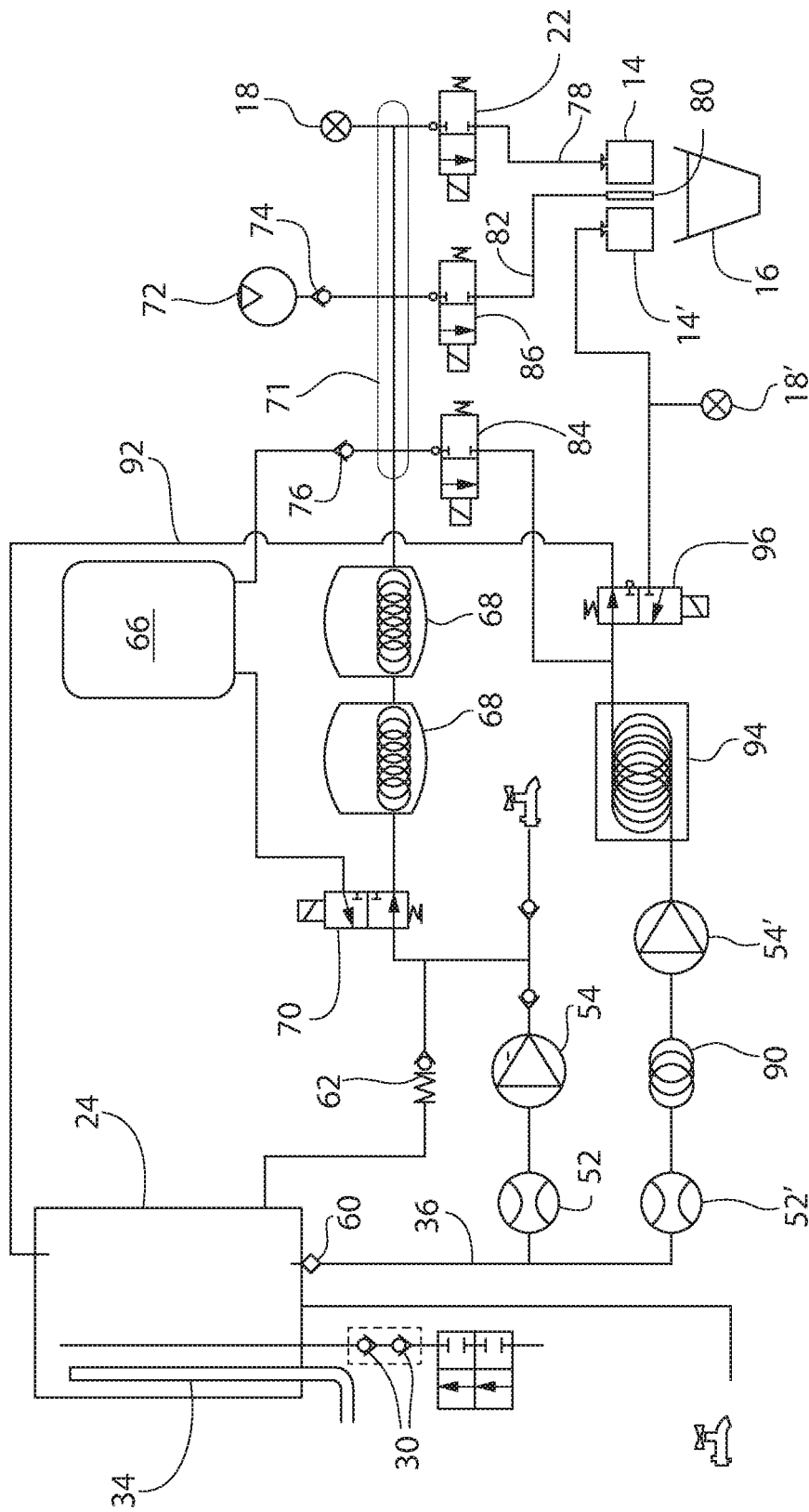
FIG. 8 is a schematic representation of a beverage dispensing apparatus in accordance with a second embodiment of the invention.

An alternative embodiment of a beverage preparation fluid circuit 12' is shown in FIG. 8. This alternative beverage preparation fluid circuit 12' could be incorporated into the beverage dispensing apparatus 10 of FIG. 1. Although this fluid circuit 12' is shown without a controller, it is to be understood that a controller could be used in connection with this alternative embodiment in a similar manner as described above. The beverage preparation fluid circuit 12' is a dual pressure system in which the water supply line 312 splits into a low pressure branch and a high pressure branch.

The low pressure branch corresponds largely to the arrangement described previously with respect to FIG. 7, and it includes the flowmeter 52, the pump 54, and the valve 70, the chilling tank 66, and hot water tanks 68, which supply cold or hot water to the supply manifold 71 where it is supplied to the (low-pressure) injector tube via the (low-pressure) injector valve 86 or the mixing nozzle 80 via the mixing valve 84.

The high pressure branch also comprises a flowmeter 52' and a pump 54'. A pulse dampener 90 is included between the flowmeter 52' and the pump 54'. The water is supplied from the pump 54' to a water heater 94 and then to a high-pressure injector valve 96. The high-pressure injector valve 96 is a 3-port 2-way solenoid valve which directs the water either to a return line 92 or to a high-pressure injector tube. The return valve 84 coupled to the supply manifold 71 feeds into the high pressure branch at a point which is upstream of the high-pressure injector valve 96 and so vents to the drain line 92 via the injector valve 96.

The pump 54 on the low pressure branch is a low pressure pump which is able to prepare beverages by injection of water at only slightly elevated pressures, for example less than 1 bar gauge pressure; whereas the pump 54' on the high pressure branch is a high pressure pump which is able to prepare beverages by injection of water at higher pressures, for example pressures greater than 5 bar and up to about 20 bar.

The high-pressure injector tube may be used to supply water to a beverage ingredient container 14' which requires water of a higher pressure to prepare the beverage. For example, the beverage ingredient container 14' may be an espresso container which comprises a bed of finely ground and densely compacted coffee and so needs high pressure to be able to force the water through the bed of coffee.

During operation, flow rate information does not need to come from the flow meters 52, 52', and may be determined based on the type of beverage being dispensed. In particular, as described previously, the user may specify the beverage to be dispensed or this may be detected by the beverage dispensing apparatus 10 based on the specific beverage ingredient container 14, 14' placed into the beverage dispensing apparatus 10. Based on this input, the controller 20 configures the settings of the beverage dispensing apparatus 10 and this dictates the flow rate in the water circuit. Specifically, the controller 20 may set the operation (i.e. the speed) of the water pump 54, 54' and this may determine the flow rate. The controller 20 is therefore able to provide the current flow rate as an input to the calculation of the downstream pressure without actually receiving this from the flow meter 52, 52' or any other sensor.

The air pump 72 may also supply air to the high-pressure injector tube via the return valve 84 and the high-pressure injector valve 96 in order to de-water the beverage ingredient container 14'. During de-watering, when air is directed from the air pump 72 to the beverage ingredient container 14, 14' in order to remove water from the beverage ingredient container 14, 14', the pressure sensor 22 can be used to detect an over-pressure situation. The pressure sensor 22 is able to determine whether the air pressure in the line exceeds a safe level and turn off the air pump 72 and/or close one or more valves to divert the air away from the beverage ingredient container 14, 14'. In the dual-pressure system of FIG. 8, air is directed to the beverage ingredient container 14' by opening the return valve 22 (and closing the mixing valve 84 and low-pressure injector valve 86) and configuring the high-pressure injector valve 96 to connect to the beverage-ingredient container 14'.

Although the water circuit has been described as having separate low and high pressure injector tubes, it will be appreciated that they may join at a common nozzle which engages with both types of beverage ingredient containers 14, 14' (i.e. low and high pressure containers). Otherwise, the low and high pressure injector tubes may supply beverage-ingredient containers 14, 14' in different holders formed in the same or different doors of the beverage dispensing apparatus.

In other embodiments, the high-pressure branch may also feed into the supply manifold 71 and thus be in communication with the pressure sensor 18. However, as shown, the high-pressure branch includes a separate pressure sensor 18' upstream of the beverage ingredient container 14'.

Figure 9:
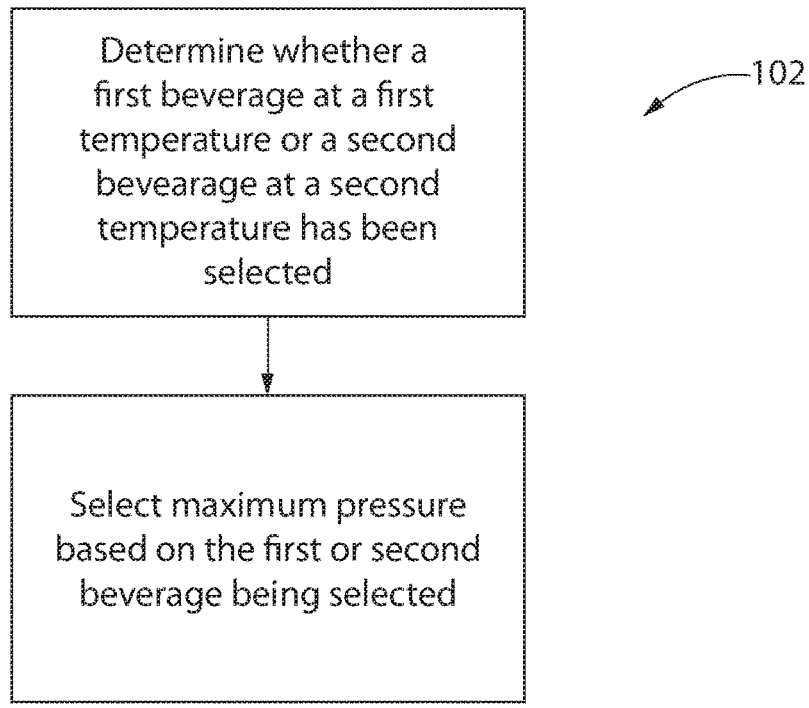
FIG. 9 is a first operational flowchart showing a sub-process which may be used for controlling the beverage dispensing apparatus of FIG. 1.

The flowchart 102 of FIG. 9 illustrates one operational aspect of the beverage dispensing apparatus 10 which can be used to dynamically control pressure for beverage preparation. In particular, this operational aspect is used to select a maximum pressure threshold for the beverage preparation fluid circuit. In this aspect, the controller 20 determines whether a first beverage at a first temperature (such as a hot beverage) has been selected, or whether a second beverage at a second temperature (such as a cold beverage) has been selected for preparation. Based on the selection of a hot or cold beverage, and in embodiments in which the heated and chilled water are maintained at predetermined temperatures, the controller 20 then selects a maximum pressure threshold based on the beverage selected for preparation and the temperature of that beverage. As part of selecting the maximum pressure threshold, the controller 20 selects from a first pressure threshold when a hot beverage is determined to have been selected and a second pressure threshold when a cold beverage is determined to be selected, with the first pressure threshold being less than the second pressure threshold. In certain embodiments, the selection of the pressure thresholds may be made by reference to a look-up table stored in a memory accessible by the controller 20, with the look-up table corresponding water temperatures with maximum pressure threshold settings. In certain other embodiments, the selection of the pressure threshold may be made by calculating the pressure threshold based on a known relationship between water temperatures and maximum pressures for the beverage preparation fluid circuit 12. During operation, after the maximum pressure threshold is selected, the controller 20 operates the beverage preparation fluid circuit 12 to regulate the beverage preparation pressure at less than the maximum pressure threshold.

In certain embodiments, the beverage preparation fluid circuit 12 may include a thermometer which measures a temperature of the water being used for preparation of the beverage, such that the controller 20 may receive a direct measurement of the temperature and select a maximum pressure threshold based on the measured temperature.

In certain embodiments, the operational aspect shown in FIG. 9 may be accomplished in the absence of a controller 20. By way of example, the selection of hot or cold-water supply using the 3/2 divert valve 70 could be made using a manual switch which also causes the selection of one of two separately selectable standard pressure release valves arranged in parallel with each other and set with different maximum pressures. Thus, if the hot water supply is selected a further 3/2 solenoid valve selects a first pressure release valve with a maximum pressure of 9.5 psi whereas if the cold-water supply is selected then the further solenoid valve selects the second pressure release valve which has a maximum pressure greater than 9.5 psi. As a result, the further 3/2 solenoid valve together with the two differently rated pressure release valves arranged in parallel operation form the pressure release system. When a temperature of water entering the beverage ingredient container is selected, by switching of the valve 70, the maximum pressure of the pressure release system is also selected by the matched movement of the further 3/2 solenoid and the resultant selection of either the first or second pressure release valves.

Figure 10:
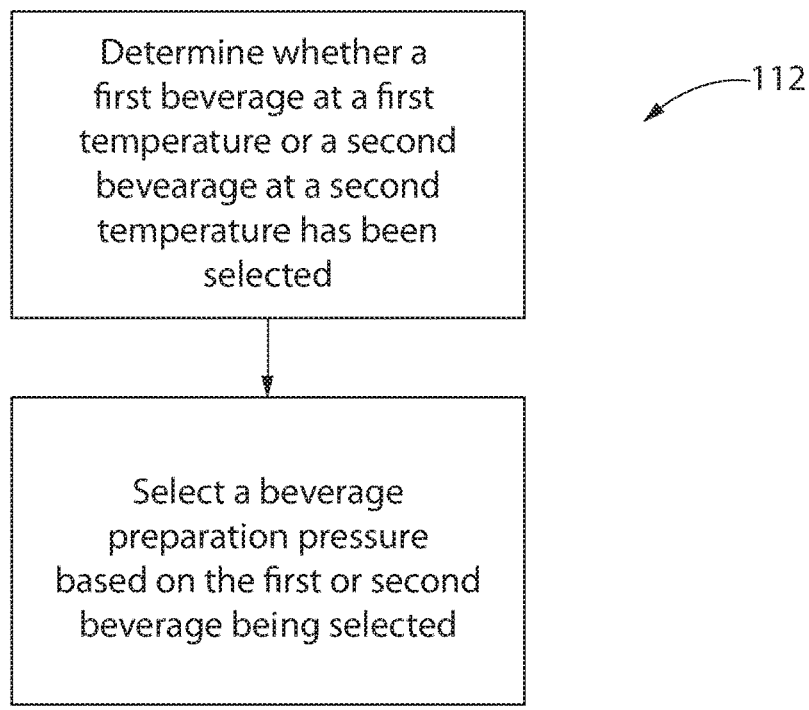
FIG. 10 is a second operational flowchart showing a sub-process which may be used for controlling the beverage dispensing apparatus of FIG. 1.

The flowchart 112 of FIG. 10 illustrates another operational aspect of the beverage dispensing apparatus 10 which can be used to dynamically control pressure for beverage preparation. In particular, this operational aspect is used to select a beverage preparation pressure for the beverage preparation fluid circuit. In this aspect, the controller 20 determines whether a first beverage at a first temperature (such as a hot beverage) has been selected, or whether a second beverage at a second temperature (such as a cold beverage) has been selected for preparation. Based on the selection of a hot or cold beverage, and in embodiments in which the heated and chilled water are maintained at predetermined temperatures, the controller 20 then selects a beverage preparation pressure based on the beverage selected for preparation and the temperature of that beverage. As part of selecting the beverage preparation pressure, the controller 20 selects from a first beverage preparation pressure when a hot beverage is determined to have been selected and a second beverage preparation pressure when a cold beverage is determined to be selected, with the first beverage preparation pressure being less than the second beverage preparation pressure. In certain embodiments, the selection of the beverage preparation pressures may be made by reference to a look-up table stored in a memory for access by the controller 20, with the look-up table corresponding water temperatures with beverage preparation pressures. In certain other embodiments, the selection of the beverage preparation pressure may be made by calculating the beverage preparation pressure based on a known relationship between water temperatures and beverage preparation pressures for the beverage preparation fluid circuit 12.

During operation, after the beverage preparation pressure is selected, the controller 20 operates the beverage preparation fluid circuit 12 to regulate the beverage preparation pressure in order to maintain pressure at the selected beverage preparation pressure. For example, where water from the chiller module 66 is being supplied for preparation of a cold beverage, the lower temperature of the water slows the delamination and bursting of the beverage ingredient container 14. As a result, the pressure of water in the beverage ingredient container 14 may be maintained longer when using chilled water than with hot water. Alternatively, the pressure may be increased, and the brewing time remain the same, or the pressure might even be decreased before delamination and bursting of the beverage ingredient container 14 takes place. During beverage preparation, in order to regulate the beverage preparation pressure, the controller 20 may control the water pump 54 to pump water via valve 70 and chiller module 66 at a higher pressure to the valves 86 and the beverage ingredient container 14. Similarly, the controller 20, by controlling the operation of the water and air pumps 54, 72, may control the time water is resident in the beverage ingredient container 14. The beverage preparation pressure may be reduced by relieving pressure via the valve 22, or alternatively, by reducing flow through the water pump 54 or the air pump 72, or by any other appropriate pressure relief mechanism.

In certain embodiments, the beverage preparation fluid circuit 12 may include a thermometer which measures a temperature of the water being used for preparation of the beverage, such that the controller 20 may receive a direct measurement of the temperature and select a beverage preparation pressure based on the measured temperature.

Figure 11:
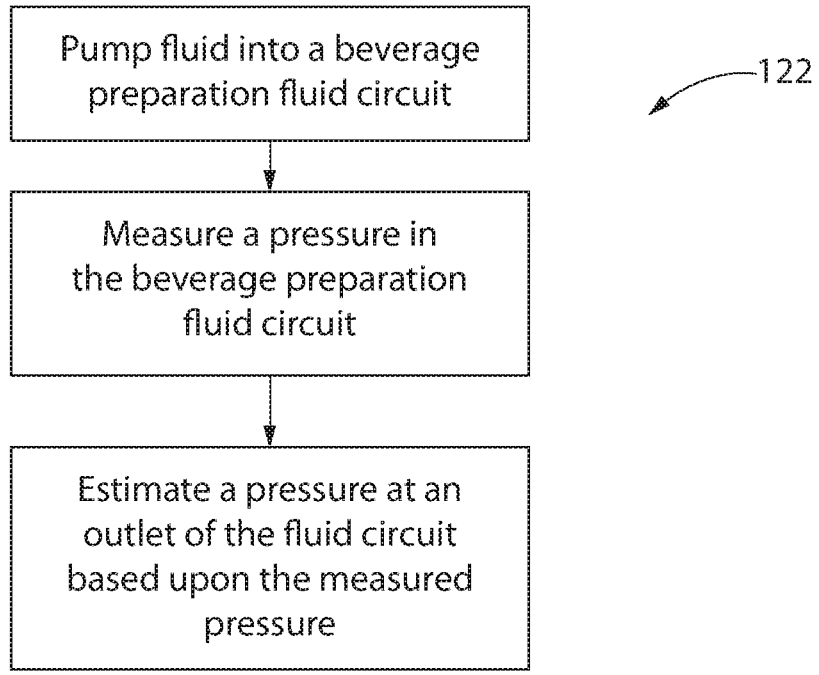
FIG. 11 is a third operational flowchart showing a sub-process which may be used for controlling the beverage dispensing apparatus of FIG. 1.

The flowchart 122 of FIG. 11 illustrates another operational aspect of the beverage dispensing apparatus 10 which can be used to dynamically control pressure for beverage preparation. In particular, this operational aspect is used to regulate a beverage preparation pressure for the beverage preparation fluid circuit so that a desired beverage preparation pressure can be maintained throughout the beverage preparation process. In this aspect, the pressure sensor 18 measures a pressure in the beverage preparation fluid circuit 12. Since the pressure sensor 18 is not located in the beverage ingredient container 14, a direct measurement of the pressure in the beverage ingredient container 14 cannot be made. However, it has been found that a pressure measurement upstream of the beverage ingredient container 14 can be used to estimate the pressure in the beverage ingredient container 14 when the flow rate of water used for the beverage preparation process is also known. The flow rate of the water can be obtained by either measuring the flow rate directly using the flow meter 52 or indirectly using the known rate at which the pump 54 is pumping water during the beverage preparation process. Therefore, by receiving a measurement signal from the pressure sensor 18 and at least one of a measurement signal from the flow meter 52 or having the pump 54 pump water at a known rate, the controller 50 may estimate the pressure at the beverage ingredient container 14. During operation, with the beverage preparation pressure being estimated, the controller 20 may operate the beverage preparation fluid circuit 12 to regulate the beverage preparation pressure in order to maintain pressure at the selected beverage preparation pressure or maintain the beverage preparation pressure under a set maximum pressure threshold.

Figure 12:
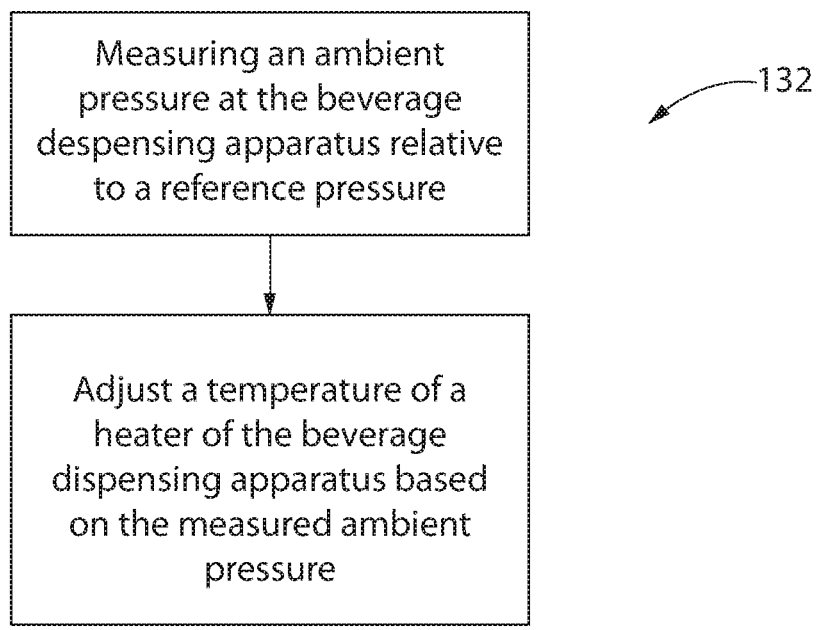
FIG. 12 is a fourth operational flowchart showing a process which may be used for controlling the beverage dispensing apparatus of FIG. 1.

The flowchart 132 of FIG. 12 illustrates another operational aspect of the beverage dispensing apparatus 10 which can be used to dynamically, yet indirectly, control pressure for beverage preparation. In particular, this operational aspect is used to regulate the temperature setting of the heating tanks 68. In this aspect, the controller 50 receives a signal indicative of an ambient air pressure, with respect to a reference pressure, and then adjusts the temperature setting of a heater based on the received signal. In certain embodiments, a sealed pressure sensor may be used to measure the ambient atmospheric pressure with respect to atmospheric pressure at sea level, and so provide an indication of the altitude at which the beverage dispensing apparatus 10 is presently located. In certain embodiments, a separate pressure sensor may be included as part of the beverage dispensing apparatus in order to obtain this atmospheric pressure measurement. However, the pressure sensor 18 may also be used for this purpose. In certain embodiments, the pressure sensor 18 may measure gauge pressure with respect to the ambient atmospheric pressure. Alternatively, the pressure sensor 18 may be sealed and provide an output with respect to a calibrated pressure. In particular, the pressure sensor 18 may be a sealed pressure sensor which measures pressure with respect to the prevailing atmospheric pressure sealed within the sensor (which may correspond to the atmospheric pressure at sea level) or an absolute pressure sensor (which may be considered to be a type of sealed pressure sensor) which measures pressure with respect to vacuum. For an absolute pressure sensor, the output may be corrected such that it reads zero at atmospheric pressure at sea level.

During a period when the beverage dispensing apparatus 10 is not preparing a beverage, the pressure sensor 18 may be exposed (vented) to the ambient atmospheric pressure by opening one or more of the return valve 22, the injector valve 86 without a beverage ingredient container 14 in place, and the mixing valve 84. The settings of the beverage dispensing apparatus 10 may then be adjusted, if necessary, to take into account the altitude of the beverage dispensing apparatus 10. In particular, the temperature settings of the hot water tanks 68, 68 and/or the water heater 92 may be adjusted based on the altitude since the boiling temperature of water varies in relation to the ambient atmospheric pressure. For example, the temperature settings may be adjusted to avoid the water boiling at the current altitude. Other brewing parameters may also be adjusted to optimize drink taste. This calibration step may be carried out once on powering up the beverage dispensing apparatus 10, periodically, or at any other time. In particular, if the beverage dispensing apparatus 10 were to be used on an airplane, then it may be necessary to recalibrate for changes in altitude/ambient pressure at more frequent intervals. The calibration may be completed automatically by the controller 50 or may be manually confirmed by a user input.

It will be appreciated by persons skilled in the art that the above embodiments have been described by way of example only and not in any limitative sense, and that various alterations and modifications are possible without departure from the scope of the protection which is defined by the appended claims.

What is claimed is:

1. A method for preparing a beverage with a beverage dispensing apparatus, the method comprising:
   step a) determining whether a first beverage to be prepared at a first temperature or a second beverage to be prepared at a second temperature has been selected for preparation, the first temperature being greater than the second temperature; and
   determining at least one of the first temperature and the second temperature based on a source of fluid used by a beverage preparation fluid circuit of the beverage dispensing apparatus; and
   step b) selecting a maximum pressure threshold for the beverage preparation fluid circuit of the beverage dispensing apparatus based on whether the first beverage or the second beverage has been determined to have been selected in the step a), wherein the maximum pressure threshold is set by selecting from at least a first pressure threshold when the first beverage has been determined to have been selected and a second pressure threshold when the second beverage has been determined to have been selected, the first pressure threshold being less than the second pressure threshold.

2. The method of claim 1, further comprising:
   step c) operating the beverage preparation fluid circuit to regulate a beverage preparation pressure at less than the maximum pressure threshold.

3. The method of claim 1, wherein the step a) comprises: measuring a temperature of a fluid used by the beverage preparation fluid circuit.

4. The method of claim 1, wherein the step a) comprises at least one of:
   providing fluid to be used by the beverage preparation fluid circuit through a fluid heating component; and
   providing fluid to be used by the beverage preparation fluid circuit at an ambient temperature or lower.

5. The method of claim 1, wherein the step a) comprises: determining whether the first beverage or the second beverage has been selected for preparation based upon a feature of a beverage ingredient container received by the beverage dispensing apparatus.

6. The method of claim 5, wherein the feature of the beverage ingredient container comprises a structural feature of the beverage ingredient container.

7. The method of claim 5, wherein the feature of the beverage ingredient container comprises a visual indicia applied to an exterior of the beverage ingredient container.

8. The method of claim 1, wherein the step a) comprises: receiving a fluid temperature selection input by a user.

9. The method of claim 1, wherein the step b) comprises: selecting the maximum pressure threshold from a look up table which corresponds fluid temperature selections with maximum pressure threshold settings.

10. A method for preparing a beverage with a beverage dispensing apparatus, the method comprising:
    step a) determining whether a first beverage to be prepared at a first temperature or a second beverage to be prepared at a second temperature has been selected for preparation, the first temperature being greater than the second temperature; and
    determining at least one of the first temperature and the second temperature based on a source of fluid used by a beverage preparation fluid circuit of the beverage dispensing apparatus; and
    step b) selecting from at least a first beverage preparation pressure and a second beverage preparation pressure for operating the beverage preparation fluid circuit of the beverage dispensing apparatus based on whether the first beverage or the second beverage has been determined to have been selected in the step a), the first beverage preparation pressure being less than the second beverage preparation pressure.

11. The method of claim 10, further comprising:
    step c) operating the beverage preparation fluid circuit to prepare the first beverage at the first beverage preparation pressure in response to the first beverage being determined to have been selected in the step a), and operating the beverage preparation fluid circuit to prepare the second beverage at the second beverage preparation pressure in response to the second beverage being determined to have been selected in the step a).

12. The method of claim 10, wherein the step a) comprises:
    measuring a temperature of a fluid used by the beverage preparation fluid circuit.

13. The method of claim 10, wherein the step a) comprises at least one of:
    providing fluid to be used by the beverage preparation fluid circuit through a fluid heating component; and
    providing fluid to be used by the beverage preparation fluid circuit at an ambient temperature or lower.

14. The method of claim 13, wherein the fluid heating component comprises a fluid heating tank, and wherein providing fluid to be used by the beverage preparation fluid circuit at an ambient temperature or lower comprises providing the fluid through a chilling tank.

15. The method of claim 10, wherein the step a) comprises:
    determining whether the first beverage or the second beverage has been selected for preparation based upon a feature of a beverage ingredient container received by the beverage dispensing apparatus.

16. The method of claim 15, wherein the feature of the beverage ingredient container comprises a structural feature of the beverage ingredient container.

17. The method of claim 15, wherein the feature of the beverage ingredient container comprises a visual indicia applied to an exterior of the beverage ingredient container.

18. The method of claim 10, wherein the step a) comprises:
    receiving a fluid temperature selection input by a user.

19. The method of claim 10, wherein the step b) comprises:
    selecting from at least the first beverage preparation pressure and the second beverage preparation pressure based upon a look up table which corresponds fluid temperature selections with beverage preparation pressure settings.

* * * * *